United States Patent [19]
Ghori et al.

[11] Patent Number: 5,884,091
[45] Date of Patent: *Mar. 16, 1999

[54] COMPUTER SYSTEM HAVING A CENTRAL PROCESSING UNIT RESPONSIVE TO THE IDENTITY OF AN UPGRADE PROCESSOR

[75] Inventors: Amar A. Ghori, Sacramento, Calif.; Adalberto Golbert, Haifa, Israel; Robert F. Krick, Beaverton, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 248,376

[22] Filed: May 24, 1994

Related U.S. Application Data

[63] Continuation-in-part of Ser. No. 163,932, Dec. 8, 1993, abandoned.

[51] Int. Cl.$^6$ ........................................... G06F 15/00
[52] U.S. Cl. ........................... 395/800.32; 395/800.34; 395/282
[58] Field of Search .................... 395/375, 800, 395/500, 395, 309, 800.01, 800.32, 800.34, 282, 283; 361/686

[56] References Cited

U.S. PATENT DOCUMENTS

| | | | |
|---|---|---|---|
| 4,716,526 | 12/1987 | Mori et al. | 395/282 |
| 4,716,529 | 12/1987 | Mori et al. | 463/14 |
| 4,885,482 | 12/1989 | Sharp et al. | 326/47 |
| 4,967,346 | 10/1990 | Freidin | 395/500 |
| 5,162,972 | 11/1992 | Anzelone et al. | 361/277 |
| 5,162,979 | 11/1992 | Anzelone et al. | 361/686 |
| 5,297,272 | 3/1994 | Lu et al. | 395/500 |
| 5,404,559 | 4/1995 | Bonella et al. | 395/307 |
| 5,410,726 | 4/1995 | Baqai et al. | 395/653 |
| 5,455,927 | 10/1995 | Huang | 395/500 |
| 5,473,766 | 12/1995 | Shaver | 395/500 |
| 5,490,279 | 2/1996 | Golbert et al. | 395/800.01 |
| 5,515,241 | 5/1996 | Werther | 361/784 |
| 5,530,620 | 6/1996 | Sangveraphunsiri | 361/686 |
| 5,551,012 | 8/1996 | Chuang et al. | 395/500 |
| 5,623,628 | 4/1997 | Brayton et al. | 711/141 |

FOREIGN PATENT DOCUMENTS

| | | |
|---|---|---|
| 0267613 | 11/1987 | European Pat. Off. . |
| 0411806 | 7/1990 | European Pat. Off. . |
| 0411806A2 | 7/1990 | United Kingdom . |
| 2264375 | 8/1993 | United Kingdom . |
| WO 89/12274 | 12/1989 | WIPO . |

OTHER PUBLICATIONS

"Compaq Systempro Personal Computer System," Technical Reference Guide, Chapter 3, pp. 27–42.

*Primary Examiner*—Zami Maung
*Attorney, Agent, or Firm*—Blakely, Sokoloff, Taylor & Zafman LLP

[57] ABSTRACT

A uniprocessing computer system is provided with an original CPU and an upgrade socket for receiving an additional processor that need not be of a single predetermined type. On system RESET, the original CPU determines if an upgrade processor is resident in the upgrade socket and, if so, what kind of upgrade processor is present. Each upgrade processor is equipped with a programmed data word for identifying the upgrade type and its features. The system includes a mechanism for communicating this upgrade information from the upgrade processor to the original CPU. The processors cooperatively configure the system properly according to the identity and features of the upgrade processor.

5 Claims, 5 Drawing Sheets

| Bits[7:6] | UPGRADE TYPE |
|---|---|
| 0 1 | TURBO Upgrade |
| 1 0 | MP Upgrade |
| 1 1 | N Upgrade |
| 0 0 | illegal/reserved |

COMPUTER SYSTEM HAVING A CENTRAL PROCESSING UNIT RESPONSIVE TO THE IDENTITY OF AN UPGRADE PROCESSOR

RELATED APPLICATIONS

This application is a continuation-in-part of U.S. patent application Ser. No. 08/163,932, filed Dec. 8, 1993, now abandoned.

BACKGROUND OF THE INVENTION

1. Field of the Invention

The present invention relates to the field of computer processing systems. More particularly, the present invention relates to the field of upgrading computer systems, particularly those employing microprocessors.

2. Art Background

Microprocessor based computer systems frequently employ printed circuit boards (PCBs) containing connectors or sockets which physically hold the microprocessor integrated circuit and provide electrical connections between the microprocessor and the remainder of the computer system via wirings etched in the PCB. These computer systems frequently rely on a single microprocessor to carry out all processing operations for the computer system. One drawback of the single microprocessor computer system is that the single processor effectively creates a bottleneck in the system thus limiting the overall speed and power of the computer.

As computer users require greater processing capabilities, the ability to upgrade to a faster microprocessor or to add additional functions or features becomes more important. One solution that computer developers have embarked upon to increase the performance of computer systems is to provide for the sharing of processing duties. It is now possible to add a math coprocessor chip to many computer systems which takes on many of the mathematical tasks for the central processing unit (CPU). Other enhancements that have been developed are graphics processors which handle the processing of graphical information to free the CPU to perform other tasks. These types of upgrades work in conjunction with and at the behest of the single CPU.

Other enhancements for computer systems include the use of two or more central processing units in what is known as a multiprocessing environment. When multiple processing units are implemented, they divide the processing work up to increase the overall performance of the computer system. Conventional multiprocessing systems are much more expensive than uniprocessing systems because the hardware to support multiple processors can be very complicated and the protocols for implementing multiprocessing are complex.

Another advance in making computer systems more powerful has been to design systems which can be readily upgraded simply by the addition of the various coprocessor chips described above. This will usually entail leaving on the PCB of the computer system one or several empty sockets which are coupled to the already present CPU (referred to as the computer system's original equipment manufacture (OEM) CPU). Each of the empty sockets is designed for a dedicated type of processor and the OEM CPU is equipped for dealing with each particular associated chip socket. For example, one socket might be dedicated for the optional addition of a math coprocessor while another socket might be for the use of a graphics coprocessor. Each of these processors may come from a different source than the computer system with the OEM CPU.

The present computer systems with dedicated expansion sockets leave many things to be desired. The nature and type of upgrade supported by a system must be preconceived at the time of system manufacturing. Many pins from the central processing unit are required for accommodating a plurality of different types of upgrade processors. The insertion of a math coprocessor chip into a socket dedicated for the use of a graphical coprocessor will not work. Likewise, a math coprocessor chip may not be added to the expansion socket for a graphics coprocessor. Further, to date no provision has been made for the creation of a multiprocessing system merely by the addition of a new processor without the addition of other supporting hardware.

One method of upgrading a computer system to use a more advanced CPU is described in co-pending U.S. patent application, "Method and Apparatus for Upgrading a Computer Processing System," Ser. No. 07/687,222 (now abandoned), filed Apr. 18, 1991 and assigned to the assignee of the present invention. That application discloses providing a dedicated upgrade socket solely for receiving an upgrade CPU. When the upgrade CPU is present, a signal is propagated from the upgrade socket to the original CPU indicating "upgrade present". The original CPU then shuts itself down and the upgrade CPU operates the computer system as a single processor system.

The reason the upgrade sockets have had to be dedicated to the various types of upgrade processors is that there has been no way for the CPU to determine what kind of processor has been inserted into an adjacent upgrade socket. It would be desirable, and is therefore an object of the present invention, to provide flexibility in the use of upgrade processors in upgrade sockets found on newly designed computer PCBs.

BRIEF SUMMARY OF THE INVENTION

From the foregoing, it can be seen that there is a need to provide improved flexibility in upgrading computer systems. It is therefore an object of the present invention to provide an improved upgradable computer system and an improved method of upgrading a computer systems.

It is further an object of the present invention to provide for the addition of an upgrade processor that need not be of a fixed type but is identifiable to the computer system's resident CPU.

It is another object of the present invention to provide for the addition of upgrade processors which can communicate their various parameters to the system's resident CPU.

These and other objects of the present invention are provided by supplying a computer system with an OEM CPU incorporating the teaching of the present invention, and an upgrade socket for receiving an upgrade processor that also incorporates the technology of the present invention. The upgrade processor need not be of a single predetermined type. In accordance with the present invention, the inserted upgrade processor communicates with the system's original OEM CPU to identify the type of processor present in the upgrade socket and its cooperative relationship with the OEM CPU. The OEM CPU and the upgrade processor then cooperate with each other to configure the computer system properly.

BRIEF DESCRIPTION OF THE DRAWINGS

The objects, features and advantages of the present invention will be apparent from the following detailed description in which.

DETAILED DESCRIPTION OF THE INVENTION

A method and apparatus are described for flexibly enhancing the processing power of computer systems. The present invention proposes an interprocessor boot-up handshake for identifying upgrade processors to a resident central processing unit (CPU) to enhance the operational performance of the computer system. In the following detailed description, numerous specific details are set forth such as specific bit locations in data words and signal names, etc., in order to provide a thorough understanding of the present invention. It will be appreciated by one having ordinarily skill in the art that the present invention may be practiced without such specific details. In other instances, well-known components, structures and techniques have not been shown in detail to avoid obscuring the subject matter of the present invention.

Figure 1:
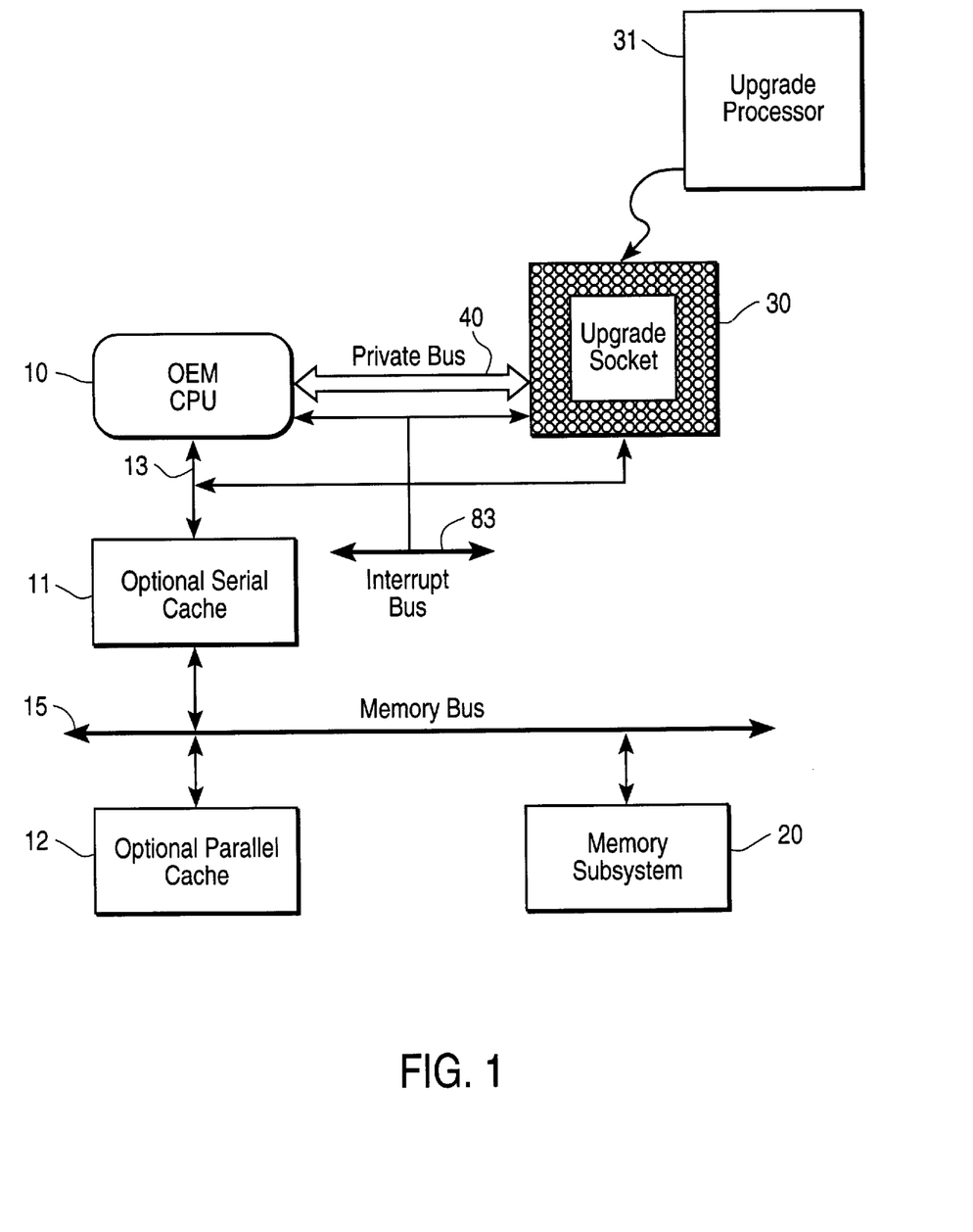
FIG. 1 shows a block layout of a general computer system incorporating aspects of the present invention.

Referring now to FIG. 1, a block diagram of a portion of one embodiment of a computer system architecture in accordance with the present invention is illustrated. As with most conventional computer system architectures, the architecture illustrated in FIG. 1 includes a central processing unit (CPU) 10 (hereinafter referred to as the system's OEM CPU) and a memory subsystem 20. The OEM CPU 10 and memory subsystem 20 are coupled together for data and instruction exchanges over a memory bus 15. As will be described below, the OEM CPU 10 will include the teachings of the present invention. There is also shown in the computer architecture an upgrade socket 30. The upgrade socket 30 is implemented such that it can accommodate the various coprocessors described above as well as providing a receptacle for an upgrade CPU 31.

The upgrade socket 30 is illustrated sharing the same bus lines 13 that couple OEM CPU 10 directly or indirectly to the memory bus 15. In another embodiment, the upgrade socket 30 may be separately coupled to the memory bus 15. There is also shown an optional serial cache 11 and an optional parallel cache 12 which may be implemented for increasing system performance. In addition to both processors being in communication with the memory bus 15, it is shown that the OEM CPU 10 and the upgrade socket 30 are coupled to an interrupt bus 83 which is used for the propagation of interrupts throughout the computer system and to the OEM CPU 10 and to the upgrade processor 31, if one is present in upgrade socket 30. More detail about the use of the interrupt bus 83 with respect to the present invention will be described below.

A private communications bus 40 is also illustrated coupled between the OEM CPU 10 and the upgrade socket 30 in FIG. 1. This private communications bus 40 may be implemented in conjunction with a "larger" private communications bus to be used when an upgrade processor is a second CPU which is capable of operating in tandem with the OEM CPU 10 to make the computer system a multi-processing system. Co-pending U.S. patent application Ser. No. 08/065,597 entitled, "Method and Apparatus for Operating a Single CPU Computer System as a Multiprocessor System", filed May 21, 1993, now U.S. Pat. No. 5,490,279 and assigned to the assignee of the present invention describes in detail a method for implementing multiprocessing using OEM CPU 10 and an appropriately configured upgrade CPU 31 inserted in upgrade socket 30. For purposes of the remaining description, the private communications bus 40 will be utilized for exchanging information between the OEM CPU 10 and an upgrade processor 31 placed in socket 30 for identifying the processor residing the upgrade socket 30 to the OEM CPU 10. Alternatively, in an implementation in which no private bus is provided, it should be understood that other communications lines such as a subset of signal lines of the memory bus may be used for implementing the boot-up handshake protocol of the present invention.

Figure 2:
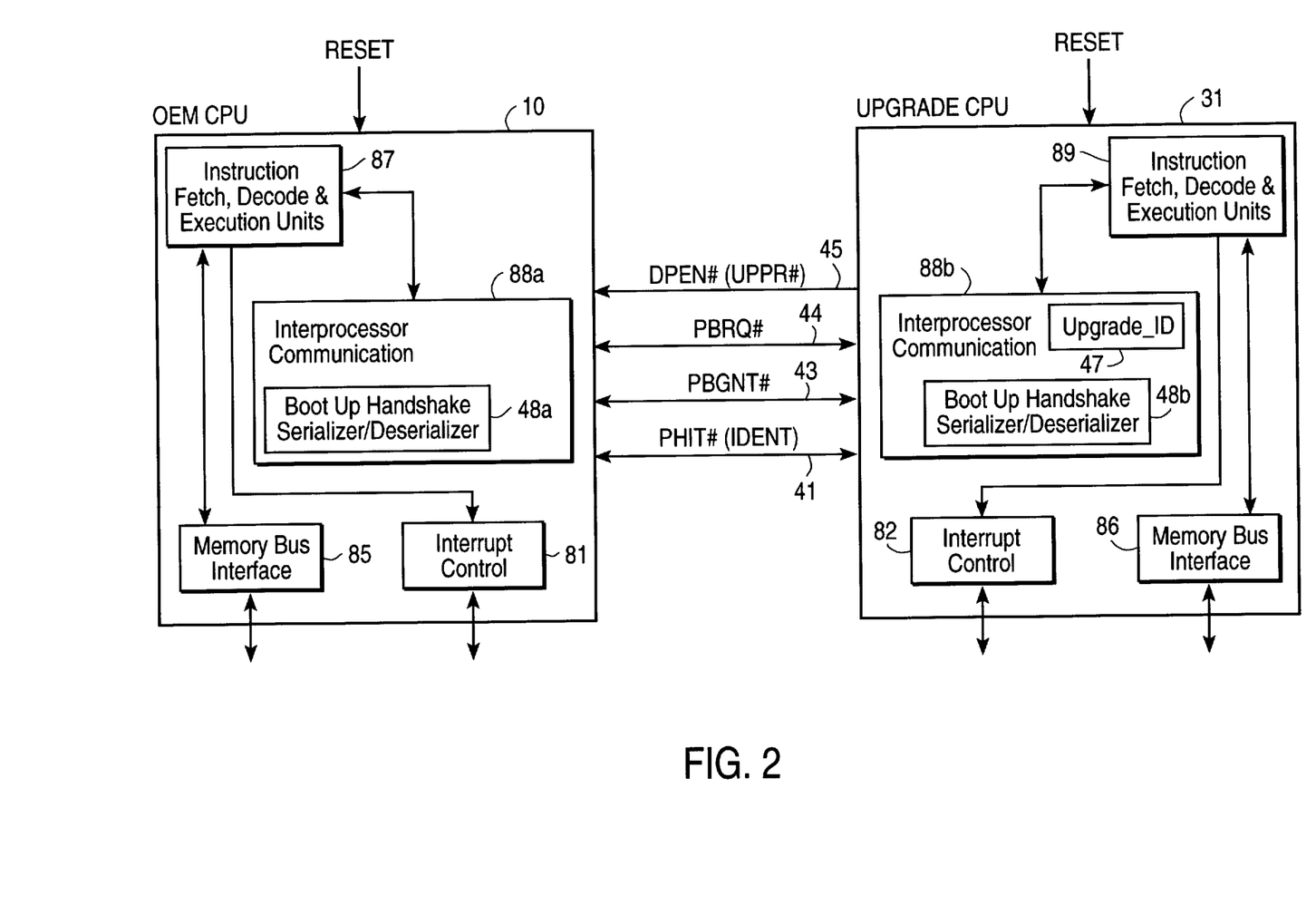
FIG. 2 shows a more detailed view of an OEM CPU and an upgrade processor and the communications lines utilized in accordance with one embodiment of the present invention.

Referring now to FIG. 2, OEM CPU 10 is shown in conjunction with an upgrade processor 31 inserted in the upgrade socket 30 of FIG. 1. Both processors are shown including instruction fetch, decode and execution units 87 and 89, respectively. Further, both processors incorporate a memory bus interface, 85 and 86, respectively, for coupling the associated processor for data and instruction exchanges over the memory bus 15 of FIG. 1. Each processor is also shown having an interrupt controller, 81 and 82, respectively, for coupling the processors for interrupt communications over the interrupt bus 83 of FIG. 1. Additionally, each processor also implements dual purpose Serializer/Deserializer circuitry 48 (48a and 48b, respectively) within their interprocessor communication circuitry, 88a and 88b, respectively, for exchanging identification and cooperative relationship information in accordance with a protocol to be described below. As described above, a plurality of signal lines are shown coupling the two processors. Specifically, in the illustrated embodiment these lines include the PHIT# line 41, PBGNT# line 43, PBRQ# line 44 and DPEN# line 45. It should be understood that in an effort to reduce the number of pins required for a processor chip, these signal lines may be multiplexed to use pins that serve other purposes at different times of the processor's operation.

The signal path DPEN# 45 is used to indicate the presence of an upgrade processor 31 in the upgrade socket 30 of FIG. 1. The OEM processor (CPU 10) samples this line during the RESET falling clock edge. In one embodiment, the upgrade processor 31 drives this line to a "low" logic level during the RESET falling clock edge. If there is no upgrade processor present, the logic level of this line remains at its default "high" value. This may be done by means of an external resistor or by an internal pull-up with a dedicated pin. Alternatively, a "high" logic value may be used to indicate the presence of an upgrade processor.

An upgrade processor in accordance with the present invention stores a data word containing identification and cooperative relationship information about itself in a memory element 47. The memory element 47 may be a discrete memory device incorporated within the interprocessor communication circuitry 88b of the upgrade processor 31 such as a register, or, alternatively, the upgrade processor may have this information burned into its read only memory (not shown).

Figure 3:
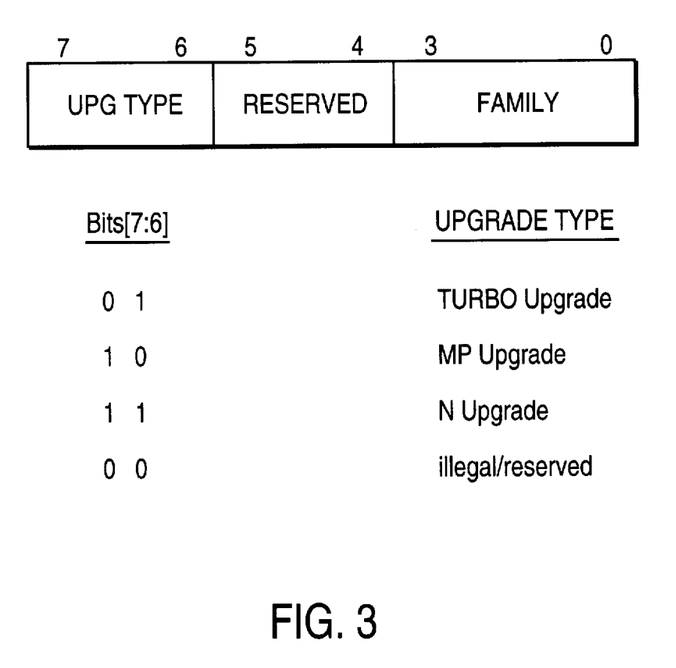
FIG. 3 illustrates a data word structure for upgrade processor identification in accordance with one embodiment of the present invention.

FIG. 3 illustrates the data arrangement of the UPGRADE_ID data word in accordance with one embodiment of the present invention. Therein, an 8-bit constant value is stored in the upgrade processor with information identifying the upgrade processor 31. Bits 0–3 contain family information about the upgrade processor which may be used in configuring the computer system's operation after boot-up. Bits 6 and 7 comprises an UPGRADE_ID word that conveys upgrade type information that infers the cooperative relationship that determines both the OEM and the upgrade processor's operation during system boot-up. With a two bit upgrade-type information field, up to four distinct types of cooperative relationships between the OEM processor and an upgrade processor can be identified, allowing for the two processors to boot themselves up in one of four distinct cooperative manners. Of course, additional data bits may be introduced to identify more types of cooperative relationships between the OEM CPU 10 and various upgrade processors.

One type of cooperative processor that may be identified is an MP Upgrade. An MP Upgrade is a CPU that, once initialized, is capable of operating in tandem with the OEM CPU 10 as a multiprocessing system. The tandem operation of the two CPUs is described in co-pending U.S. patent application, "Method and Apparatus for Operating a Single CPU Computer System as a Multiprocessor System now U.S. Pat. No. 5,490,279". In the above described embodiment, bits 7 and 6 of the stored UPGRADE_ID data word for an MP Upgrade are 1 and Ø, respectively. One distinguishing feature of an MP upgrade is an incorporated interprocessor communications protocol for the OEM CPU 10 and MP Upgrade 31 to transparently share computer system resources. In order to accommodate an MP Upgrade, the OEM CPU 10 must also be MP ready.

It is envisioned that operating systems may use the upgrade family information contained in bits 0–3 to further customize system operation. For example, as part of the boot-up and handshake protocol, the interprocessor communication circuitry 88a of the OEM CPU 10 may store the upgrade family information in a processor register or at a predetermined memory location. The operating system can read the stored information and determine that the upgrade family is the same family as the OEM CPU (e.g., both are Intel Architecture microprocessors) in which case it will configure the system and operate in a "Homogenous MP" mode. Likewise, if the operating system determines the upgrade processor family type to be different from the family type of the OEM CPU (e.g., an Intel Architecture and a non-Intel Architecture microprocessors) then it will configure the system and operate in a "Heterogeneous MP" mode. In this case, the operating system may load code compatible with the upgrade processor family type in a separate predetermined memory location where the upgrade processor can execute it. Alternatively, in the case of the upgrade and host processor having different family types, it is possible that the operating system may determine it does not have software compatible with the upgrade processor's family type. In that situation, the operating system may choose to not start the upgrade processor and to continue to operate in uniprocessor mode.

Another cooperative upgrade processor type, identified, in this embodiment, by a Ø and 1, respectively, in bits 7 and 6 of the UPGRADE_ID data word, can be characterized as a "Turbo" Upgrade. A Turbo Upgrade is an upgrade CPU which may be more advanced than the resident OEM CPU but is not equipped for operating in tandem with the OEM CPU 10 as a multiprocessing system. The presence of a Turbo Upgrade in an upgrade socket signals the resident OEM CPU 10 to shut down, leaving the Turbo processor to operate as the computer system's uniprocessor CPU.

Another cooperative type of upgrade processor is the "accelerator" or N Upgrade. Such N Upgrades include the math coprocessors and graphics processors described above. In this embodiment, accelerator upgrades store a 1 in both of bits 7 and 6 of the UPGRADE_ID word. Although these processors are not complete CPUS, in order to operate in accordance with the present invention they still should incorporate aspects of the present invention for interprocessor communications as well as store the UPGRADE_ID data word described above.

Figure 4:
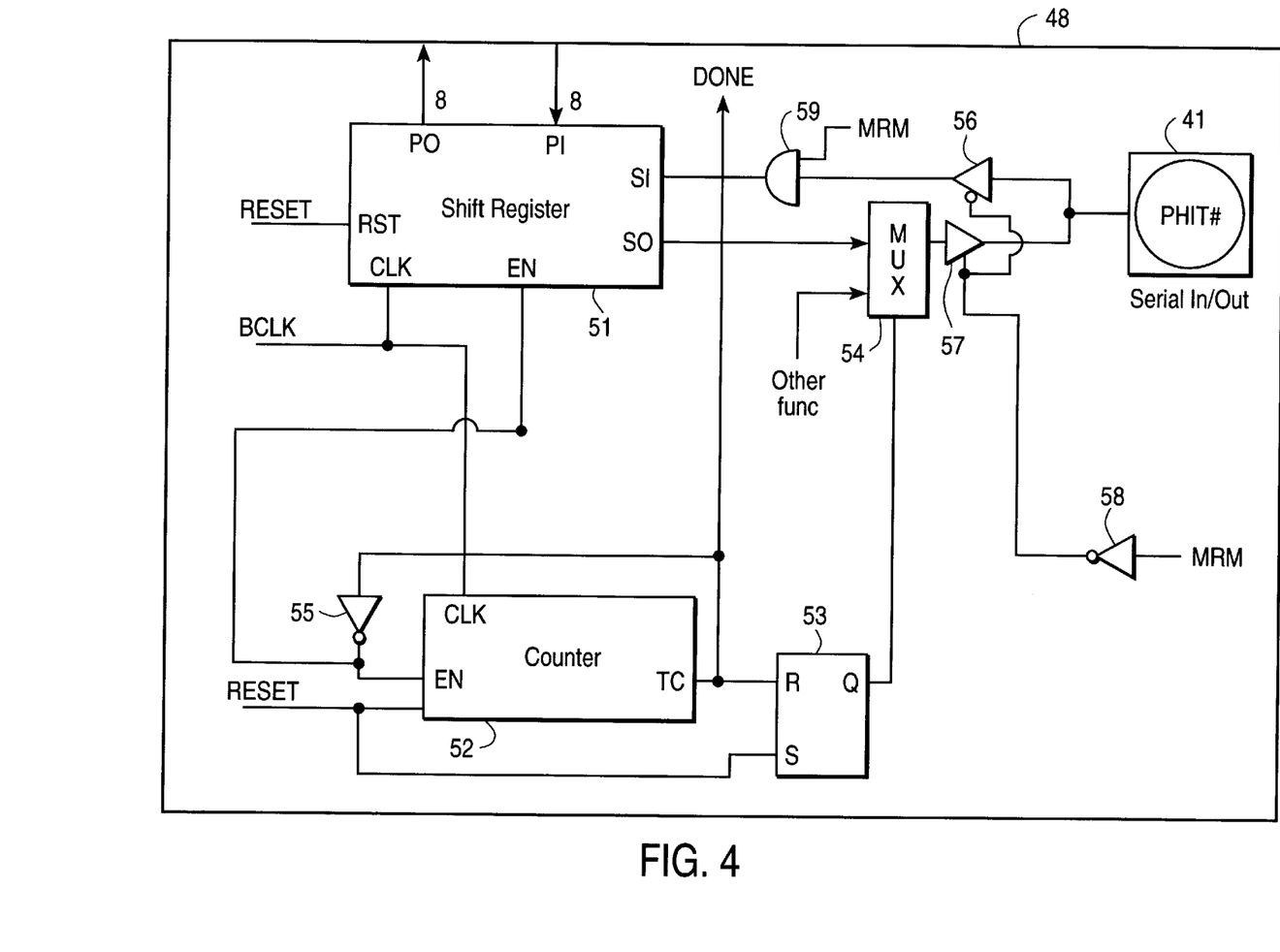
FIG. 4 illustrates a more detailed diagram of one embodiment of circuitry useful for exchanging processor identification information between an upgrade processor and a resident OEM processor.

FIG. 4 illustrates the Serializer/Deserializer circuitry 48 of the present invention for passing the UPGRADE_ID data word between the upgrade and OEM processors during system boot-up. The Serializer/Deserializer circuitry 48 is used by the upgrade processor 31 to shift out the UPGRADE_ID whereas the Serializer/Deserializer circuitry 48 is used by the OEM CPU 10 to shift in the UPGRADE_ID.

For the process of supplying the UPGRADE_ID, in one mode, the PHIT# line 41 is used for serially conveying the data between the upgrade and the OEM processors. For an embodiment where the PHIT# line 41 is implemented as an integral part of an interprocessor private communications bus used for multiprocessing, on completion of this process the upgrade processor reverts the communication line 41 to its alternative purpose of providing cache hit indications for the maintenance of local cache coherency.

In one mode, the communication protocol between the upgrade processor 31 and the OEM CPU 10 is synchronous and serial with 1 start bit, no stop bits, and 8 data bits. The order of data transmission in this mode is ascending; bit Ø (LSB) is sent first, bit 7 (MSB) is sent last. The handshake communication takes place on every deassertion of RESET to the two processors where the RESET signal is received by the processors through a dedicated RESET pin incorporated on each processor chip. It should be understood that future processors may need to transmit more identifying information. Thus, the number of data bits transmitted for the handshake may vary.

The Serializer/Deserializer circuitry 48 comprises the shift register 51 called the UPGRADE_ID_MSR, which in one embodiment is 8 bits wide. In one embodiment designed to be compatible with Intel's Pentium™ processor, this register is mapped to the processor's private register space at address 0x14. The value in the register is accessible to software by using the RDMSR instruction of the Pentium's instruction set. Other architectures may provide suitable means for mapping the shift register 51 to a predetermined address and reading its content therefrom.

During the assertion of RESET, the UPGRADE_ID to be transmitted is preferably loaded in parallel into the shift register 51 in the upgrade processor 31. A counter 52 is set to "ØØØ" and the flag flip-flop 53 is set to indicate that the boot-up handshake should occur. In one mode, the counter 52 is a 3-bit counter, to provide addressing of the $2^3$ bits of shift register 51 when that register is an eight (8) bit register. The output of flip-flop 53 provides a control signal to a multiplexer 54 which determines whether the PHIT# line 41 is operating for upgrade identification purposes or for an alternative purpose such as cache hit indication signaling for maintaining local cache coherency as described above.

A processor's identity as an OEM CPU or upgrade may be determined at the time of manufacturing. At the time of system boot-up the shift register 51, counter 52 and flag flip-flop 53 are clocked by an external processor clock (BCLK) (not shown). At RESET, for one embodiment, as will be described in more detail below, signal MRM (indicating which processor is the Most Recent Master with respect to memory bus ownership) is in the logic "high" state for the OEM processor and "low" for the upgrade processor. For the OEM processor, the logic "high" state of the MRM signal causes the bi-directional buffers 56 and 57 on signal line PHIT# 41 to be configured as input buffers. Similarly, for the upgrade processor, the logic "low" level MRM signal configures the bi-directional buffers 56 and 57 on signal line PHIT# 41 for output.

The MRM signal for the embodiment described above is set to logic "high" for the processor that is the current owner of the memory bus. As described earlier, the OEM CPU 10 and the upgrade processor 31 each include memory bus interface circuitry for interfacing with the computer system's memory bus. For implementing one embodiment of the present invention, the memory bus interface circuitry 85 of the OEM CPU 10 and the interface circuitry 86 of upgrade processor 31 set the corresponding MRM signal to logic "high" and "low", respectively, indicating the OEM processor as the most recent owner of the memory bus. The MRM signals may then be provided to the Serializer/Deserializer circuitry 48 of the respective processors described above with respect to FIG. 4.

After RESET is deasserted, the upgrade processor 31 pulls signal line PHIT# 41 "low" for 1 clock cycle signaling a start bit to the OEM CPU 10. This is followed by shifting out the contents of the shift register 51 one bit at a time. For the synchronous ascending order embodiment described above, bit Ø is shifted out first and bit 7 last. The counter 52 keeps track of the number of bits shifted out and after shifting the last bit, it asserts the signal DONE which resets the flag flip-flop 53.

On the OEM CPU 10 side of the transaction, after the deassertion of RESET, the OEM CPU 10 waits for the start bit. Once the start bit from the upgrade processor 31 is recognized (PHIT# line 41 goes low), the outputs of the shift register 51 of the upgrade processor 31 are clocked into the OEM CPU 10's shift register 51. Once again, the OEM CPU's counter 52 indicates completion of the transfer and further loading of the register is disabled. The flag flip-flop 53 is then reset and the transfer process is complete.

Note that the above description of the exchange of the upgrade information has been illustrated in the case where the information is serially propagated between the two processors. In an alternative embodiment, a plurality of signal lines may be used between the upgrade socket 30 and the resident OEM CPU 10 to provide for the parallel propagation and simultaneous loading of the upgrade information into a register of the Serializer/Deserializer circuitry 48a of the OEM CPU 10. As described above the circuitry implemented for the handshake protocol is the same circuitry for both the OEM CPU and the upgrade processor. This simplifies design for a manufacturer that produces both OEM CPUs and upgrade processors. Another advantage of the present design is that it may exploit existing bus lines which further reduces computer system design complexity.

As noted above, the computer system illustrated in FIG. 1 also shows OEM CPU 10 and upgrade processor 31 being provided with interrupt controllers 81 and 82, respectively. The interrupt controllers of the two processors are coupled to an interrupt bus 83 which also is used for propagation of interrupts to and from the other computer components (not shown). In one embodiment, interrupt messages are propagated over the interrupt bus 83 between components with each interrupt message specifying a destination for the interrupt as well as other information. One use of the interrupt bus in accordance with the present invention will be described below with respect to operating the computer system with multiple processors.

Figures 5A, 5B:
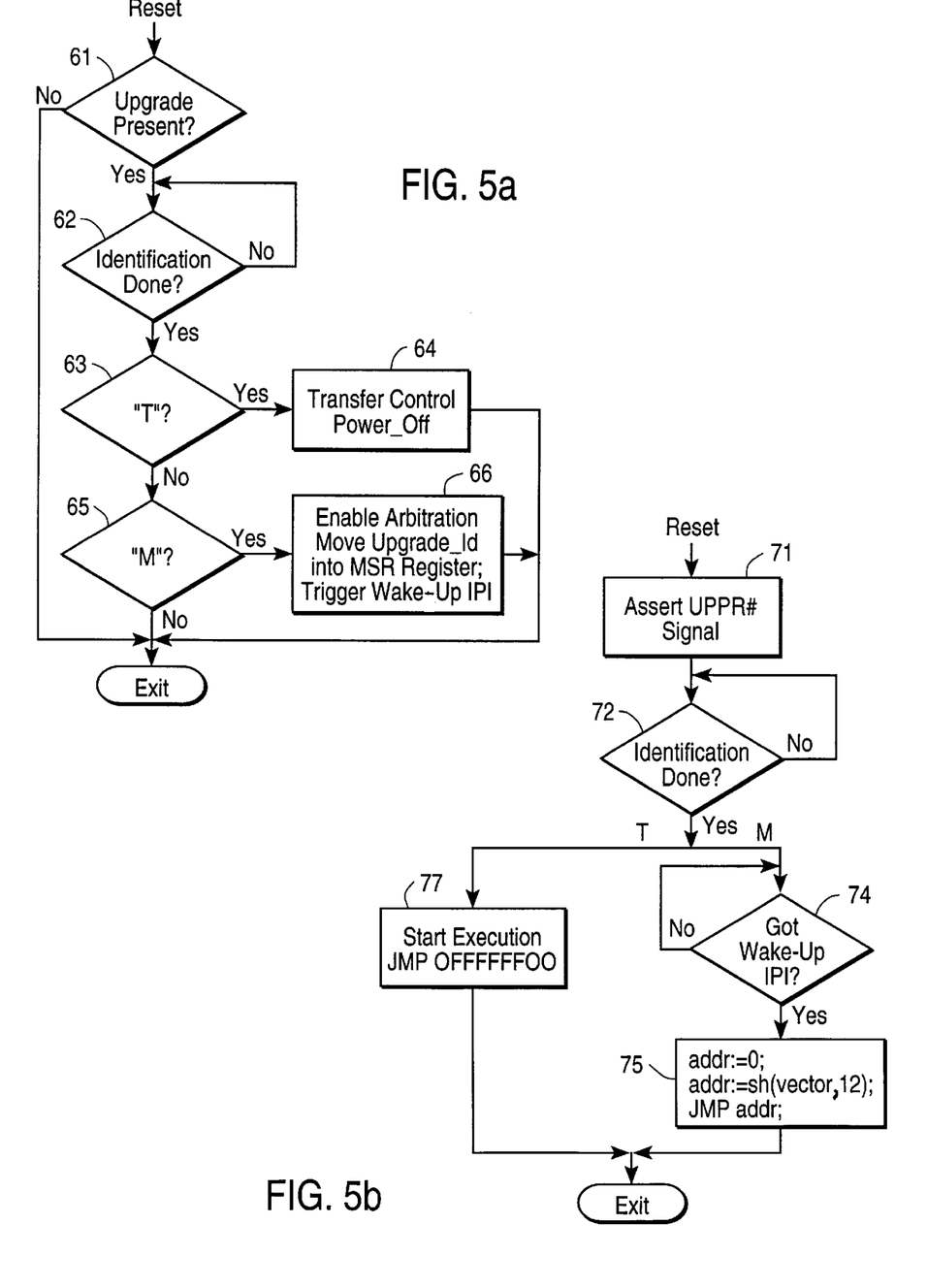
FIGS. 5(a) and 5(b) illustrate, respectively, flowcharts followed by a resident OEM CPU and an upgrade processor in carrying out one embodiment of present invention.

Referring now to FIGS. 5(*a*) and 5(*b*) the method of operation of the present invention will be described. FIG. 5(*a*) illustrates a flow chart of the operation of the OEM CPU 10 during system boot-up while FIG. 5(*b*) shows the procedure of the upgrade processor 31 if one is present in upgrade socket 30. As described above, the upgrade processor uses the UPPR# signal line 45 (also referred to above as DPEN#) to indicate its presence in the upgrade socket, step 71. In the case of one embodiment the upgrade processor pulls the signal line to a "low" logic level. Upon asserting the UPPR# signal, the upgrade processor loads its UPGRADE_ID into the Serializer/Deserializer circuitry, transmits the start bit over the PHIT# line and outputs its UPGRADE_ID to the OEM CPU, step 72. At corresponding step 61 being implemented in the OEM CPU, after RESET, the OEM processor 10 checks for the presence of an upgrade processor. If no upgrade processor is present, the OEM processor skips the remainder of the boot-up handshake protocol. If an upgrade processor is present in the upgrade socket, the OEM processor will wait for the start bit and then receive the UPGRADE_ID data word supplied by the upgrade processor by means of its Serializer/Deserializer circuitry as described above with respect to FIG. 4, step 62.

In an alternative embodiment the UPPR# signal line 45 may be omitted. In such a case, the OEM CPU 10 may be configured to wait a predetermined amount of time for the arrival of the UPGRADE_ID. If no UPGRADE_ID arrives, it can be assumed that no upgrade processor is present in the upgrade socket.

Once the OEM CPU has completed receiving the UPGRADE_ID of upgrade processor at step 62, it will proceed according to the type of upgrade present in the upgrade socket. For each kind of upgrade the OEM CPU will behave differently depending upon the type of upgrade present. If at decision box 63 the OEM CPU determines from the UPGRADE_ID of the upgrade processor that the upgrade processor is a Turbo processor then at step 64 the OEM CPU configures the computer system accordingly and then transfers control to the Turbo processor before turning itself off. In one embodiment, the process of the Turbo processor taking over the bus involves enabling a Dual-Processor arbitration mechanism. This mechanism is disabled during RESET at which time the OEM processor is designated the Most Recent Master of the memory bus as described above. When the processor in the upgrade socket is a Turbo processor, the OEM CPU activates the arbitration mechanism and designates the upgrade processor as the master of the memory bus. The OEM CPU will then shut down and, the upgrade processor being a Turbo processor, the upgrade processor will remain the master of the memory bus. At corresponding step 77 of the upgrade routine of FIG. 5(*b*) the Turbo processor will start execution as the system's sole CPU with a jump (JMP) to a predetermined address.

If the processor in upgrade socket is capable of operating in tandem with the OEM CPU in a multiprocessing environment then at decision box 65 of FIG. 5(*a*), bits 7 and 6 of the UPGRADE_ID will be a 1 and a Ø, respectively. At step 66 the OEM CPU will activate a multiprocessing arbitration mechanism. The OEM CPU will store the upgrade processor's UPGRADE_ID in the mapped MSR register. At corresponding step 74 of FIG. 5(*b*) the upgrade processor will initiate a wait-loop. The upgrade processor will remain in this loop until it receives an interprocessor interrupt from the OEM CPU which in one embodiment is called "start up IPI".

The OEM CPU, at step 66 of FIG. 5(*a*), based upon the type of processor present in the upgrade socket triggers an interrupt to the upgrade processor via the interrupt control circuitry described above. In one mode, the interrupt to the upgrade processor may include a vector field identifying a starting address for the upgrade processor. For one embodiment designed for the Intel Architecture, the vector field is 8-bits long and specifies the base address of a 4 KB page in the lowest 1 Meg. address space as the starting address. For example, a vector of 0xbd specifies the 32-bit starting address of 0x000bd000.

At corresponding step 75, responsive to the interrupt the upgrade processor will wake up and prefetch its first instruction from a predetermined or provided starting address.

An interprocessor boot-up handshake method and apparatus have been described. Although the present invention has been described in terms of various embodiments, it will be appreciated by those skilled in the art that various modifications and alterations might be made without departing from the spirit and scope of the present invention. The invention should, therefore, be measured in terms of the claims which follow.

We claim:

1. An upgrade central processing unit (CPU) comprising: interprocessor communication circuitry configured to transmit information to and to receive information from an original equipment manufacturer (OEM) processor, including information to allow the upgrade CPU and the OEM processor to operate cooperatively in a computer system in a multi-processor mode, wherein the interprocessor communication circuitry comprises a handshake serializer/deserializer that processes handshake signals to the OEM processor and from the OEM processor, the serializer/deserializer comprising:
a shift register that receives and transmits a data word in parallel and receives and transmits a data word in serial; and
a bidirectional buffer coupled to the shift register, comprising:
a first buffer that is enabled when the bi-directional buffer is in an input configuration; and
a second buffer that is enabled when the bi-directional buffer is in an output configuration;
the bi-directional buffer transmitting and receiving handshake information via a line of a private bus between the upgrade CPU and the OEM processor.

2. The upgrade CPU of claim 1, further comprising:
an instruction fetch unit;
an instruction decode unit;
an instruction execution unit;
interrupt control circuitry coupled to the instruction fetch unit, the instruction decode unit, the instruction execution unit and to an interrupt bus of the computer system; and
memory bus interface circuitry coupled to the instruction fetch unit, the instruction decode unit, the instruction execution unit and to a memory bus of the computer system.

3. An upgrade central processing unit (CPU) comprising: interprocessor communication circuitry configured to transmit information to and to receive information from an original equipment manufacturer (OEM) processor, including information to allow the upgrade CPU and the OEM processor to operate cooperatively in a computer system in a multiprocessor mode, wherein the interprocessor communication circuitry comprises a handshake serializer/deserializer that processes handshake signals to the OEM processor and from the OEM processor, the serializer/deserializer comprising:
a shift register that receives and transmits a data word in parallel and receives and transmits a data word in serial; and
a bi-directional buffer coupled to the shift register, comprising:
a first buffer that is enabled when the bidirectional buffer is in an input configuration;
a second buffer that is enabled when the bi-directional buffer is in an output configuration, wherein the bidirectional buffer transmits and receives handshake information via a line of a private bus between the upgrade CPU and the OEM processor, and wherein the serializer/deserializer further comprises a selector that determines whether the line of the private bus conveys handshake information or other information.

4. An upgrade central processing unit (CPU) comprising: interprocessor communication circuitry configured to transmit information to and to receive information from an original equipment manufacturer (OEM) processor, including information to allow the upgrade CPU and the OEM processor to operate cooperatively in a computer system in a multiprocessor mode, wherein the interprocessor communication circuitry comprises a handshake serializer/deserializer that processes handshake signals to the OEM processor and from the OEM processor, the serializer/deserializer comprising:
a shift register that receives and transmits a data word in parallel and receives and transmits a data word in serial; and
a bidirectional buffer coupled to the shift register, comprising:
a first buffer that is enabled when the bi-directional buffer is in an input configuration;
a second buffer that is enabled when the bidirectional buffer is in an output configuration, wherein the bi-directional buffer transmits and receives handshake information via a line of a private bus between the upgrade CPU and the OEM processor, and wherein the serializer/deserializer further comprises a selector that determines whether the line of the private bus conveys handshake information or other information, wherein the serializer/deserializer further comprises an input for receiving a most recent master (MRM) signal that configures the bi-directional buffer according to which of the OEM processor and upgrade processor has ownership of a memory bus of the computer system.

5. An upgrade central processing unit (CPU) comprising: interprocessor communication circuitry configured to transmit information to and to receive information from an original equipment manufacturer (OEM) processor, including information to allow the upgrade CPU and the OEM processor to operate cooperatively in a computer system in a multiprocessor mode, wherein the interprocessor communication circuitry comprises a handshake serializer/deserializer that processes handshake signals to the OEM processor and from the OEM processor, the serializer/deserializer comprising:
a shift register that receives and transmits a data word in parallel and receives and transmits a data word in serial; and
a bi-directional buffer coupled to the shift register, comprising:
a first buffer that is enabled when the bidirectional buffer is in an input configuration;

a second buffer that is enabled when the bidirectional buffer is in an output configuration, wherein the bi-directional buffer transmits and receives handshake information via a line of a private bus between the upgrade CPU and the OEM processor, and wherein the serializer/deserializer further comprises a selector that determines whether the line of the private bus conveys handshake information or other information, wherein the other information includes a cache hit signal transmitted to maintain cache coherency in the multi-processor mode.

* * * * *